A. E. BUCHENBERG.
DYNAMO ELECTRIC MACHINE.
APPLICATION FILED JUNE 25, 1917.
1,401,112.
Patented Dec. 20, 1921.
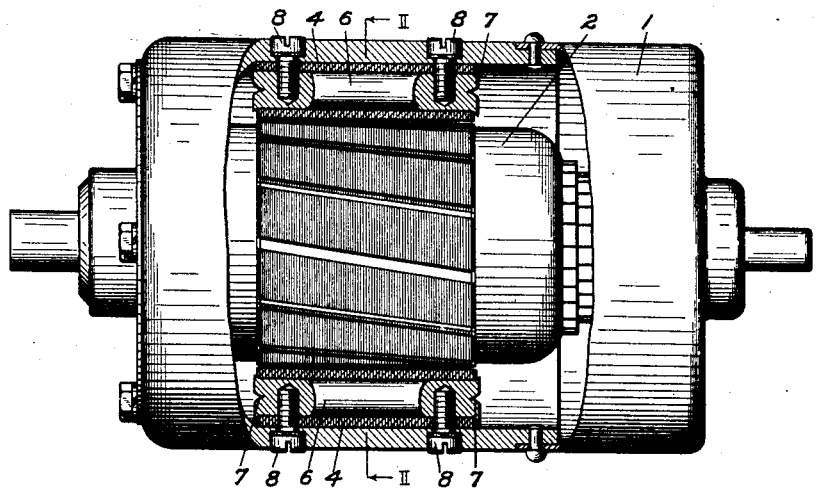
Fig. I.
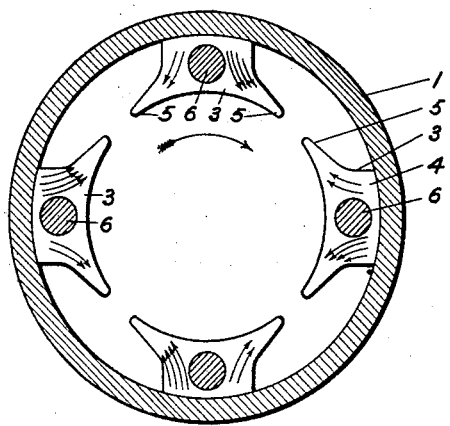
Fig. II.
Inventor
Alvin E. Buchenberg
By Chester H. Braselton
Attorney

UNITED STATES PATENT OFFICE.

ALVIN E. BUCHENBERG, OF TOLEDO, OHIO, ASSIGNOR TO ELECTRIC AUTO-LITE CORPORATION, OF TOLEDO, OHIO, A CORPORATION OF DELAWARE.

DYNAMO-ELECTRIC MACHINE.

1,401,112.  Specification of Letters Patent.  Patented Dec. 20, 1921.

Application filed June 25, 1917. Serial No. 176,810.

*To all whom it may concern:*

Be it known that I, ALVIN E. BUCHENBERG, a citizen of the United States, residing at Toledo, in the county of Lucas and State of Ohio, have invented certain new and useful Improvements in Dynamo-Electric Machines, of which I declare the following to be a full, clear, and exact description.

This invention relates to the construction of dynamo-electric machines and particularly to that class of machines having a frame to which are attached salient pole pieces.

An object of the invention is to provide a machine of this nature in which the distortion of the field flux due to armature reaction shall be reduced to a minimum.

Another object is to provide a simple and inexpensive means for binding together the laminations composing a pole piece and for clamping the pole piece to the frame.

Further objects of this invention relate to economies of manufacture and details of construction as will hereinafter appear from the detailed description to follow. I accomplish the objects of my invention in one instance by the devices and means described in the following specification, but it is evident that the same may be varied widely without departing from the scope of the invention as pointed out in the appended claims. A structure constituting one embodiment of my invention, which may be the preferred, is illustrated in the accompanying drawings forming a part hereof, in which:

Figure I is a side elevation of a dynamo-electric machine embodying my invention, a portion of the side wall of the casing being broken away to show the armature and the field poles, partly in section and partly in elevation.

Fig. II is a vertical, sectional view, taken substantially on the line II—II of Fig. I, the field winding not being shown and the armature being omitted.

In the drawings, similar reference numerals refer to similar parts throughout the several views, and the sectional views are taken looking in the direction of the little arrows at the ends of the section lines.

As I have already stated, it is desirable in a dynamo-electric machine to minimize the amount of sparking at the brushes. This sparking is largely due to the distortion of the magnetic field which, in a large measure, is due to the magnetic cross flux set up by the rotation of the armature with reference to the field poles. This magnetic flux and distortion of the field is relatively greatest in the period immediately following the starting of the machine and increases until the field poles are magnetically saturated so that the cross flux is eliminated. I accomplish the object of my invention by providing means so that the point of saturation of the field pole is reached more quickly than in the type of field poles heretofore known, so that the consequent distortion of the field and the sparking at the brushes is reduced to a minimum.

Considering the numbered parts of the drawing, it will be seen that the dynamo electric machine comprises a frame or casing 1, a rotatable armature 2, and pole pieces 3. In this instance, I have shown a four pole machine, but the number of poles employed is a matter of choice and forms no part of this invention. The pole pieces 3 are preferably constructed of laminated soft iron punchings 4, the cross section of which are approximately rectangular with extensions or tips 5 at the corners nearest to the armature. The inner sides of the pole pieces form with the tips 5, an arc of a circle concentric with the armature. The laminæ making up the pole pieces are provided with central openings therein and are held in place by means of a relatively large rivet 6, of any convenient cross section, which is here shown as cylindrical, which rivet passes through the central openings in said laminæ and supports them and holds them together in alinement. This rivet is made of any suitable material which is non-magnetic or has a magnetic permeability relatively so low that, for the purposes of this specification, it may be described as non-magnetic. A rivet made of brass or copper answers these purposes. This rivet is placed near the polar axis of the pole pieces, and has its end swaged in, as at 7, to bind the laminæ in place. Machine screws 8 pass through the side wall of the casing and are threaded into the rivet to hold the pole pieces in place. This rivet is preferably, although not necessarily, held in a position parallel to the armature shaft.

The operation of this device should be very readily understood from the description given above. Referring to Fig. II, the small arrows there shown indicate the relative density of the magnetic flux in the pole pieces under normal operating conditions. If the field poles were energized and the armature circuit left open, the number of arrows, or in other words, the density of the magnetic flux on both sides of the non-magnetic rivet in each field pole would be the same.

Now when current traverses the armature conductors a cross flux is set up in the pole pieces which in the case of a generator rotating in the direction indicated by the arrow weakens the field in the side corresponding to the leading pole tip and strengthens it in the side corresponding to the trailing tip. This is indicated in a general way by the arrows in Fig. II.

The pole piece and rivet are so proportioned that the cross sectional area of those portions between the rivet and the sides of the pole piece is such that under normal excitation of the field poles they are nearly saturated and a slight additional flux due to armature reaction brings the portion at one side of the rivet up to the point of complete saturation. A further increase in armature flux due to increased armature current cannot thereafter produce a corresponding distortion of the field flux. Distortion of the field flux is further reduced by placing the rivet close to the pole face, thereby providing a restricted path for the cross flux which readily saturates this portion. Since the field distortion is minimized, it is unnecessary to provide for such wide adjustment of the brushes in order to compensate for field distortion and a greater electric stability is obtained. Furthermore, this forms a very effective means for supporting the laminated pole piece with reference to the casing of the machine, so that the rivet has a mechanical as well as an electrical function.

I am aware that the particular embodiment of my invention, here shown and described, is susceptible of considerable variation without departing from the spirit of my invention, but I have found that this particular embodiment is desirable from many standpoints, and, therefore, I desire to claim the same specifically as well as broadly, as indicated by the appended claims.

Having thus described my invention, what I claim as new, and desire to secure by Letters Patent is—

1. In a dynamo electric machine, the combination of a frame, a pole piece, means extending through said pole piece for reducing flux distortion therein and means engaging said first means and said frame for clamping said pole piece to said frame.

2. In a dynamo-electric machine having an armature, the combination of a frame, a pole piece and means for securing said pole piece to said frame, said means including a non-magnetic portion extending through the pole piece and serving to reduce flux distortion produced by said armature.

3. In a dynamo-electric machine the combination of a frame, an armature rotatably mounted therein, a plurality of pole pieces, means extending radially through said frame for clamping said pole-pieces to said frame and a single non-magnetic element embedded in each of said pole pieces adjacent the polar face thereof for engaging said means and for reducing flux distortion due to armature reaction.

4. In a dynamo-electric machine the combination of a frame, a pole-piece of magnetic material secured thereto, said pole-piece having a rod of non-magnetic material extending longitudinally therethrough and positioned to divide the pole-piece into two halves connected by a restricted portion and means engaging said frame and said rod to secure the pole-piece to the frame.

5. In a dynamo-electric machine the combination of a frame, an armature and a pole-piece therebetween, said pole-piece having a rod of non-magnetic material extending longitudinally therethrough adjacent the polar face thereby reducing the effect of armature reaction, and threaded means engaging said rod and frame for securing said pole-piece to said frame.

6. In a dynamo-electric machine the combination of a frame, a pole piece carried thereby, said pole-piece having an aperture in proximity to the polar face for preventing a substantial distortion of flux due to armature reaction, a non-magnetic member in said opening and means engaging said frame and member for clamping the pole-piece to the frame.

7. In a dynamo-electric machine, the combination of a casing, a pole piece comprising a plurality of laminæ, a non-magnetic rod upon which said laminæ are mounted, said rod being positioned adjacent the polar face of said pole piece and a screw passing through said casing and said rod for securing said pole piece to said casing.

8. In a dynamo-electric machine the combination of a frame, a pole-piece carried thereby having an aperture extending longitudinally therethrough dividing the pole-piece to provide two substantially parallel paths for the main flux and providing a restricted path therethrough for armature cross flux, a non-magnetic rod in said aperture and means engaging said frame and said rod for clamping the pole-piece to the frame.

9. In a dynamo-electric machine the combination of a circular casing, a plurality of laminated pole-pieces connected thereto and adapted to coöperate with an armature, each of said pole-pieces having a rivet of non-magnetic material extending longitudinally therethrough to bind the laminations together, said rivet being so proportioned and positioned that the pole-piece is thereby divided radially into two portions forming substantially parallel paths adapted to be saturated by the main flux, said portions being connected by a narrow portion forming a restricted path for armature flux.

10. In a dynamo-electric machine the combination of a frame, a plurality of laminated pole-pieces carried thereby, a non-magnetic rivet extending through each of said pole-pieces to bind the laminations together, said rivet being positioned centrally of said pole-piece and close to the pole face to divide the pole-piece into two paths for the main flux which will saturate the same under normal excitation and to provide a restricted path at the pole face for the armature cross flux to thereby reduce the effect of armature reaction.

11. In a dynamo-electric machine comprising a rotatable armature, the combination of a field frame, a laminated pole piece, a non-magnetic rod extending axially therethrough close to the polar face to bind the laminæ together and to form therein two restricted flux paths and screws engaging said frame and said rod for securing the pole piece to the frame.

In testimony whereof I affix my signature.

ALVIN E. BUCHENBERG.